No. 643,610. Patented Feb. 13, 1900.
J. SCHIRRA.
BICYCLE SUPPORT.
(Application filed Feb. 21, 1899.)
(No Model.)
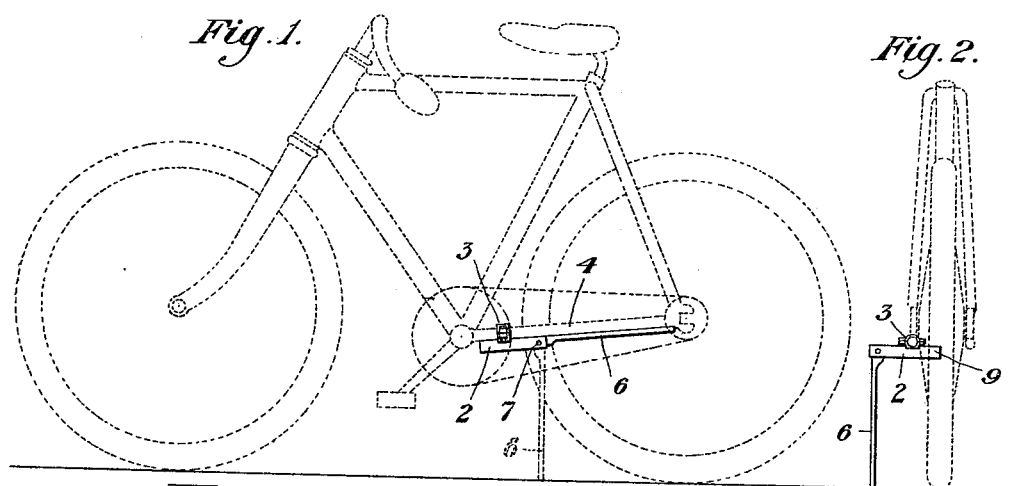
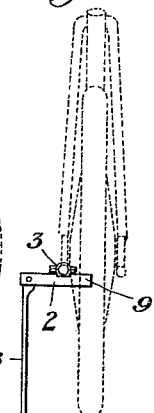
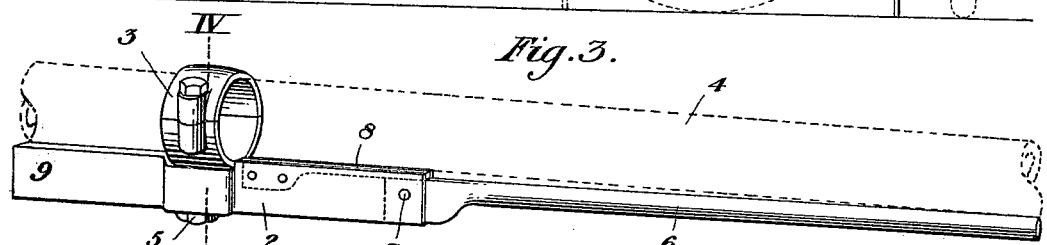
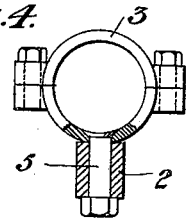
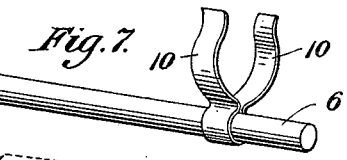
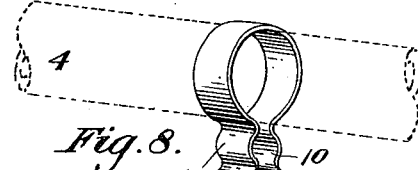
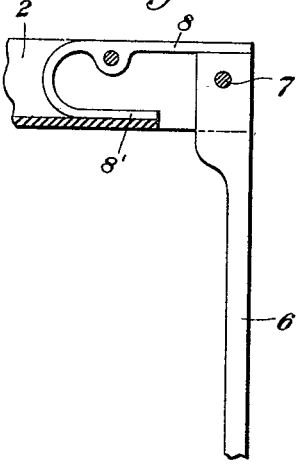
Witnesses:
O. C. Butterfield
M. W. Scott
Inventor:
Julius Schirra
by O. M. Clarke
his attorney.
THE NORRIS PETERS CO., PHOTO-LITHO., WASHINGTON, D. C.

UNITED STATES PATENT OFFICE.

JULIUS SCHIRRA, OF PITTSBURG, PENNSYLVANIA, ASSIGNOR, BY DIRECT AND MESNE ASSIGNMENTS, OF FIVE-EIGHTHS TO WESLEY G. CRONKRIGHT AND IDA S. FAILER, OF SAME PLACE.

BICYCLE-SUPPORT.

SPECIFICATION forming part of Letters Patent No. 643,610, dated February 13, 1900.

Application filed February 21, 1899. Serial No. 706,328. (No model.)

*To all whom it may concern:*

Be it known that I, JULIUS SCHIRRA, a citizen of the United States, residing at Pittsburg, in the county of Allegheny and State of Pennsylvania, have invented or discovered a new and useful Improvement in Bicycle-Supports, of which the following is a full, clear, and exact description, reference being had to the accompanying drawings, forming part of this specification, in which—

Figure 1 is a view in side elevation of a bicycle equipped with my improved support. Fig. 2 is a back view showing the support extended to brace the machine. Fig. 3 is a detail perspective view of the device folded up under the side frame. Fig. 4 is a cross-section taken on the line IV IV of Fig. 3. Fig. 5 is a detail of the joint, showing the stem turned down. Fig. 6 is a similar view illustrating a modified form of spring. Fig. 7 is a detail showing a securing-clip for attachment to the frame. Fig. 8 is a similar view showing the clip attached to the frame.

My invention consists of a device for attachment to the frame of a bicycle for supporting the same in an upright position. It comprises a swivelly-mounted arm with a securing-clip, by which it is attached to the frame of a bicycle, and a spring-controlled supporting-leg pivotally mounted therein adapted to be thrown downwardly to bear against the ground and to brace the machine against falling.

Referring now to the drawings, 2 is an arm provided with a separable clamp 3, by which the arm is secured around one of the side frames 4 of a bicycle. The arm and clamp are connected by a bolt 5 in such a way that the arm will swing around on the bolt with relation to the clamp in the manner of a swivel. The operative end of the arm is formed with a space intervening between the sides, within which space is pivotally mounted the supporting-bar 6 by rivet or bolt 7, and the pivotal end of such bar is enlarged and made square in order to provide bearing for a spring 8, secured within the arm, which spring is made of considerable strength, so as to hold the bar in an extended position, as in Fig. 3, or downwardly, as in Fig. 5, by pressure against the top or end.

In its normal position the bar is folded up under the frame-bar 4, where it will be retained by spring action until required for use, when the bar and arm 2 may be swung around, as indicated in Fig. 2, and the bar turned down, its end resting on the ground. It will be seen that in the action of swinging the arm 2 around, an extension 9, projecting outwardly at the opposite end, will be thrown into contact with the wheel or by properly locating the clamp it will be thrown inside the rim, thus locking the wheel by interference with the spokes.

In Fig. 6 I have illustrated a modified form of spring having a reversed branch portion 8', adapted to bear against the bottom part of the arm and to assist in exerting pressure on the square end of the bar.

In Fig. 7 the bar is supplied with spring-clips 10, adapted to embrace the frame-bar and to assist in holding the bar in position, while in Fig. 8 such clips are shown attached to the frame and adapted to engage the end of the bar for a similar purpose.

The advantage of a device of this character by which the bicycle may be maintained in a standing position without other support will be appreciated by users of this class of vehicles; and it will be understood that its proportions and details may be changed by the skilled mechanic without departing from my invention.

What I claim, and desire to secure by Letters Patent, is—

1. In a supporting device for bicycles the combination of a separable clamp adapted to be secured to the bicycle-frame, an arm swivelly attached to the clamp so as to permit lateral swinging motion, an extension of the arm at one side of the swivel-joint adapted to be thrown into contact with the wheel of the bicycle, a supporting-bar pivotally mounted in the opposite end of the arm provided with flat spring bearing-surfaces on the end and side and a spring adapted to bear on such surfaces and to retain the bar in a closed or extended position respectively.

2. In a supporting device for bicycles the combination of a separable clamp adapted to be secured to the bicycle-frame, an arm swivelly attached to the clamp so as to permit lateral swinging motion, an extension of the arm at one side of the swivel-joint adapted to be thrown into contact with the wheel of the bicycle, a supporting-bar pivotally mounted in the opposite end of the arm provided with flat spring bearing-surfaces on the end and side, a spring adapted to bear on such surfaces and to retain the bar in a closed or extended position respectively, and a spring-clip adapted to secure the free end of the arm to the bicycle-frame.

In testimony whereof I have hereunto set my hand.

JULIUS SCHIRRA.

Witnesses:
 PETER J. EDWARDS,
 C. M. CLARKE.